(12) United States Patent
Ozawa

(10) Patent No.: US 8,649,371 B2
(45) Date of Patent: Feb. 11, 2014

(54) GATEWAY DEVICE, COMMUNICATION SYSTEM, AND COMMUNICATION METHOD

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 400 days.

(21) Appl. No.: 12/865,782

(22) PCT Filed: Feb. 10, 2009

(86) PCT No.: PCT/JP2009/052189
§ 371 (c)(1),
(2), (4) Date: Aug. 2, 2010

(87) PCT Pub. No.: WO2009/104493
PCT Pub. Date: Aug. 27, 2009

(65) Prior Publication Data
US 2011/0090881 A1    Apr. 21, 2011

(30) Foreign Application Priority Data
Feb. 19, 2008   (JP) ................................. 2008-037334

(51) Int. Cl.
*H04L 12/50*   (2006.01)

(52) U.S. Cl.
USPC ............................ 370/366; 370/353; 370/354

(58) Field of Classification Search
USPC ......... 370/353–356, 358, 389, 466, 468, 470, 370/472, 338, 467
See application file for complete search history.

(56) References Cited

U.S. PATENT DOCUMENTS

2010/0128715 A1*   5/2010   Dei et al. ...................... 370/352

FOREIGN PATENT DOCUMENTS

| JP | 58-215151 A | 12/1983 |
|---|---|---|
| JP | 8-331031 A | 12/1996 |
| JP | 2000196619 A | 7/2000 |
| JP | 2002507870 A | 3/2002 |
| JP | 2002354144 A | 12/2002 |
| JP | 2002368677 A | 12/2002 |
| JP | 2003198638 A | 7/2003 |
| JP | 2006516181 A | 6/2006 |
| WO | 2004075508 A | 9/2004 |
| WO | 2007040085 A | 4/2007 |

OTHER PUBLICATIONS

International Search Report for PCT/JP2009/052189 mailed Mar. 24, 2009.
3GPP TS 23.002 V7.1.0. Technical Specification Group Services and Systems Aspects; Network architecture (Release 7), Mar. 2006, pp. 36-38.

(Continued)

*Primary Examiner* — Dady Chery
(74) *Attorney, Agent, or Firm* — Sughrue Mion, PLLC

(57) ABSTRACT

A gateway apparatus 110 includes: a communication unit 111 communicating a frame signal conforming to an IuUP (Iu User Plane) protocol with a wireless base station controller connected to a circuit switching network 101; a determination unit 112 for determining whether the frame signal received by the communication unit indicates a time alignment request for a sound signal to a circuit switching network or not; a conversion unit 113, converting information included in the frame signal to information to be set in a call control signal of an IMS (IP Multimedia Subsystem) when the frame signal indicates a time alignment request; and a call control signal transmission unit 114 transmitting the call control signal including the converted information to a communication apparatus in the IMS 102.

16 Claims, 10 Drawing Sheets

(56) References Cited

OTHER PUBLICATIONS

3GPP TS 29.163 V8.0.0, Technical Specification Group Core Network and Terminals; Interworking between the IP Multimedia (IM) Core Network (CN) subsystem and Circuit Switched (CS) networks (Release 8), Sep. 2007, pp. 88-89.

3GPP TS 26.090 V5.0.0, Technical Specification Group Services and Systems Aspects; Mandatory Speech Codec speech processing functions; Adaptive Multi-Rate (AMR) speech codec; Transcoding functions (Release 5), Jun. 2002, pp. 13-15.

3GPP TS 25.415 V7.3.0, Technical Specification Group Radio Access Network; UTRAN Iu interface user plane protocols (Release 7), Dec. 2006, pp. 11-13.

H. Schulzrinne et al., "RTP: A Transport Protocol for Real-Time Applications", Network Working Group, RFC 1889, Jan. 1996, pp. 37-38.

3GPP TS 25.415 V7.3.0, Technical Specification Group Radio Access Network; UTRAN Iu interface user plane protocols (Release 7), Dec. 2006, pp. 25-27.

S. Donovan, "The SIP Info Method", Network Working Group, RFC 2976, Oct. 2000, pp. 1-9.

* cited by examiner

GATEWAY DEVICE, COMMUNICATION SYSTEM, AND COMMUNICATION METHOD

This application is the National Phase of PCT/JP2009/052189, filed Feb. 10, 2009, which is based upon and claims the benefit of priority from Japanese patent application No. 2008-037334, filed on Feb. 19, 2008, the disclosure of which is incorporated herein in its entirety by reference.

TECHNICAL FIELD

The present invention relates to a gateway apparatus (device) for realizing multimedia services such as voice service and TV telephone by connecting a radio network controller (RNC) and a fixed network or an IMS (IP Multimedia Subsystem) core network in a cellular phone network.

BACKGROUND ART

A cellular phone terminal and a cellular phone network using the third-generation W-CDMA technique use a circuit switching network or the protocol of circuit switching in order to realize a voice telephone and a TV telephone.

On the other hand, there is a movement to provide multimedia service on such a circuit switching network by using an IMS on an IP network. In the future, various services are going to be unified on an IMS core network. The configuration of an IMS is described in, for example, Non Patent Literature (NPL) 1 specified by 3GPP (3rd Generation Partnership Project) which will be described later and TS23.228.

CITATION LIST

Patent Literature

{NPL 1} 3rd Generation Partnership Project, "3GPP TS 23.002 v7.1.0" pp. 36 to 38, FIG. 6, issued in March, 2006, http://www.3gpp.org/ftp/Specs/html-info/23002.htm, searched on the Internet on Dec. 27, 2007.

{NPL 2} 3rd Generation Partnership Project, "3GPP TS 29.163 v8.0.0" pp. 88 to 89, FIG. 32, issued in September, 2007, http://www.3gpp.org/ftp/Specs/html-info/29163.htm, searched on the Internet on Dec. 27, 2007

{NPL 3} 3rd Generation Partnership Project, "3GPP TS 26.090 v5.0.0" pp. 13 to 15, Table 1, issued in June, 2002, http://www.3gpp.org/ftp/Specs/html-info/26090.htm, searched on the Internet on Dec. 27, 2007

{NPL 4}3rd Generation Partnership Project, "3GPP TS 25.415 v7.3.0" pp. 11 to 13, FIG. 3, issued in December, 2006, http://www.3gpp.org/ftp/Specs/html-info/25415.htm, searched on the Internet on Dec. 27, 2007

{NPL 5} IETF Audio-Video Transport Working Group, "Request For Comment (RFC) 1889", pp. 37 to 38, Section 6.6, issued in January, 2006, ftp://ftp.rfc-editor.org/in-notes/rfc1889.txt, searched on the Internet on Dec. 28, 2007

{NPL 6} 3rd Generation Partnership Project, "3GPP TS 25.415 v7.3.0"; "6.5.4 Time Alignment procedure", pp. 25 to 27, issued in December 2006, http://www.3gpp.org/ftp/Specs/html-info/25415.htm, searched on the Internet on Dec. 27, 2007

{NPL 7} IETF Network Working Group, "Request For Comment (RFC) 2976", issued in October, 2000, http://www.faqs.org/ftp/rfc/pdf/rfc2976.txt.pdf, searched on the Internet on Feb. 5, 2008

SUMMARY OF INVENTION

Technical Problem

When providing multimedia service on a circuit switching network by using an IMS, an IMS core network has to be connected to the circuit switching network. In this case, a communication protocol of the IMS core network is different from that of the circuit switching network. Therefore, even when a frame signal of a multimedia service is supplied from the circuit switching network to the IMS, the IMS cannot properly perform the signal call control and the flow control.

Frame signals from a circuit switching network to an IMS core network includes, for example, a signal requesting adjustment of a transmission timing of a sound signal in the downlink direction (from the IMS core network to the circuit switching network) (hereinbelow, called "time alignment request"). Also in the case where the time alignment request is issued, it is difficult to perform the frame signal call control and the flow control on the IMS side, so that the time alignment request cannot be recognized. As a result, a problem such that a downlink sound signal is not transmitted at a proper timing occurs.

The present invention has been achieved in view of the drawbacks and an object of the invention is to provide a gateway apparatus transferring a time alignment request issued from a circuit switching network to an IMS core network.

Solution to Problem

A gateway apparatus (device) of the present invention includes: a communication unit communicating a frame signal conforming to an IuUP (Iu User Plane) protocol with a wireless base station controller connected to a circuit switching network; a determination unit determining whether the frame signal received by the communication unit indicates a time alignment request for a sound signal to the circuit switching network or not; a conversion unit converting information included in the frame signal to information to be set in a call control signal of an IMS (IP Multimedia Subsystem) when the frame signal indicates the time alignment request; and a call control signal transmission unit transmitting the call control signal including the converted information to a communication apparatus in the IMS.

Another gateway apparatus of the present invention includes: a communication unit communicating a frame signal conforming to an IuUP (Iu User Plane) protocol with a wireless base station controller connected to a circuit switching network; a determination unit determining whether the frame signal received by the communication unit indicates a time alignment request for a sound signal to the circuit switching network or not; a conversion unit converting information included in the frame signal to information to be set in a flow control signal of an IMS (IP Multimedia Subsystem) when the frame signal indicates the time alignment request; and a flow control signal transmission unit transmitting the flow control signal including the converted information to a communication apparatus in the IMS.

A communication system of the present invention has a gateway apparatus; and a call controller connected to the gateway apparatus communicatably, wherein the gateway apparatus comprises: a first communication unit communicating a frame signal conforming to an IuUP (Iu User Plane) protocol with a wireless base station controller connected to a circuit switching network; a determination unit determining whether the frame signal received by the first communication unit indicates a time alignment request for a sound signal to the circuit switching network or not; a conversion unit converting information included in the frame signal to information to be set in a call control signal of an IMS (IP Multimedia Subsystem) when the frame signal indicates the time alignment request; and a second communication unit transmitting the information converted by the conversion unit to the call controller, and the call controller comprises the call control signal transmission unit transmitting a call control signal including the information received from the gateway apparatus to a communication apparatus in the IMS.

Another communication system of the present invention has a gateway apparatus; and a flow controller connected to the gateway apparatus communicatably, wherein the gateway apparatus comprises: a first communication unit communicating a frame signal conforming to an IuUP (Iu User Plane) protocol with a wireless base station controller connected to a circuit switching network; a determination unit determining whether the frame signal received by the first communication unit indicates a time alignment request for a sound signal to the circuit switching network or not; a conversion unit converting information included in the frame signal to information to be set in a flow control signal of an IMS (IP Multimedia Subsystem), when the frame signal indicates the time alignment request; and a second communication unit transmitting the information converted by the conversion unit to the flow controller, and the flow controller comprises a flow control signal transmission unit transmitting the flow control signal including the information received from the gateway apparatus to a communication apparatus in the IMS.

A communication method of the present invention includes the steps of: receiving a frame signal conforming to an IuUP (Iu User Plane) protocol from a wireless base station controller connected to a circuit switching network; determining whether the frame signal indicates a time alignment request for a sound signal to the circuit switching network or not; converting information included in the frame signal to information to be set in a call control signal of an IMS (IP Multimedia Subsystem) when the frame signal indicates the time alignment request; and transmitting the call control signal including the converted information to a communication apparatus in the IMS.

Another communication method of the present invention includes the steps of: receiving a frame signal conforming to an IuUP (Iu User Plane) protocol from a wireless base station controller connected to a circuit switching network; determining whether the frame signal indicates a time alignment request for a sound signal to the circuit switching network or not; converting information included in the frame signal to information to be set in a flow control signal of an IMS (IP Multimedia Subsystem) when the frame signal indicates the time alignment request; and transmitting a flow control signal including the converted information to a communication apparatus in the IMS.

Advantageous Effects of Invention

According to the present invention, on a frame signal indicative of a time alignment request issued from a circuit switching network, a call control process or flow control adapted to the IMS core network can be performed. Therefore, a downlink sound signal can be transmitted at a proper timing.

Figure 1:
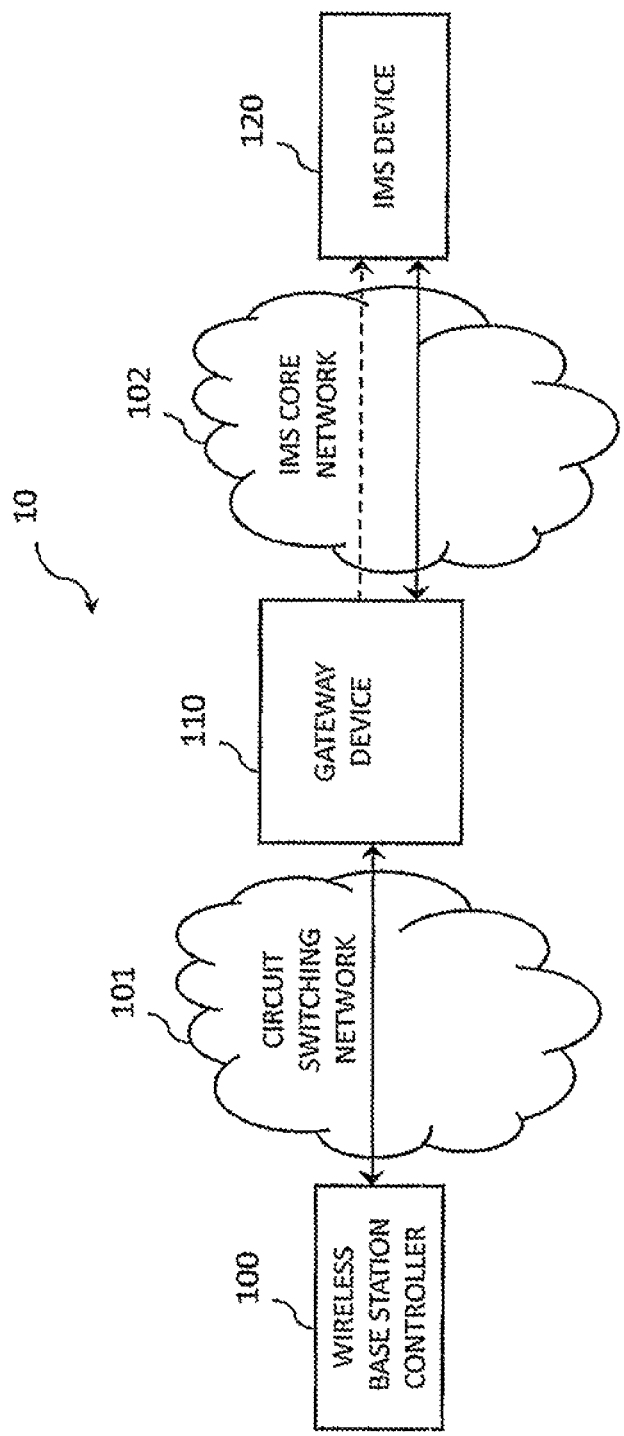
FIG. 1 is a configuration diagram of a communication system in a first embodiment of the present invention.

10, 20, 30, 40: communication system
100: wireless base station controller
101: circuit switching network
102: IMS core network
110, 210, 310, 410: gateway apparatus
120: IMS apparatus
200, 400: U-plane gateway apparatus
210: call controller
410: flow controller
111, 115, 202, 204, 311, 315, 402, 404: U-plane data communication unit
112, 201, 312, 401: determination unit
113, 203, 313, 403: protocol conversion unit
114, 211, 314, 411: flow control signal transmission unit
205, 212, 405, 412: MEGACO communication unit

DESCRIPTION OF EMBODIMENTS

First Embodiment

FIG. 1 shows a communication system configuration of a first embodiment of the present invention. In a communication system 10 of the embodiment, a wireless base station controller 100 and a gateway apparatus 110 are connected to each other via a circuit switching network 101. An IMS apparatus 120 is connected to the gateway apparatus 110 via an IMS core network 102 formed in an IP network.

An IMS-MGW (IMS media gateway) apparatus may be used as the IMS apparatus 120. The configuration of the IMS-MGW apparatus is described in, for example, NPL 2 using 3GPP, the criteria TS23.228 and TS29.163, and the like. The configuration of the IMS core network 102 is described in NPL 1, the criterion TS23.228, and the like.

The communication system 10 of the embodiment uses AMR (Adaptive Multi-Rate) for a voice codec for voice call service. The AMR is described in the NPL 3 using 3GPP, the criterion TS26.071, and the like. Except for the AMR, another voice codec such as AMR-WB or AMR-WB+ can be also used. AMR-WB and AMR-WB+ are described in TS26.190 of 3GPP and TS26.290, respectively.

The gateway apparatus 110 receives a frame signal conforming to the protocol used in the circuit switching network 101 as user plane data from the wireless base station controller 100. As the protocol, for example, the IuUP (Iu User Plane) protocol can be used. The IuUP protocol is described in NPL 4 using 3GPP and the like.

Figure 2:
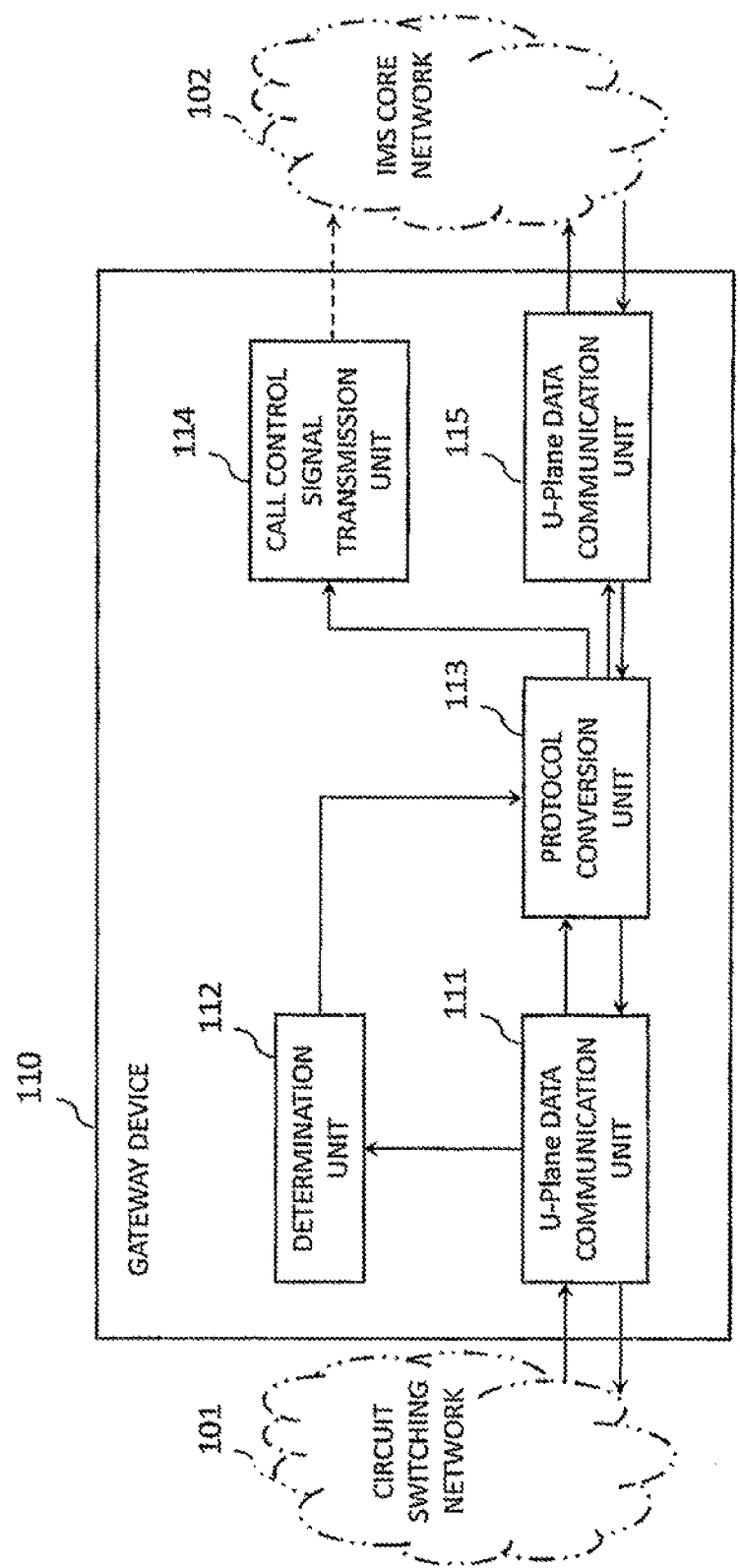
FIG. 2 is a block diagram of a gateway apparatus in the first embodiment of the invention.

FIG. 2 shows the functional configuration of the gateway apparatus 110. A U-plane (User Plane) data communication unit 111 communicates a frame signal conforming to the IuUP protocol with the wireless base station controller 100 (FIG. 1) via the circuit switching network 101. A U-plane data communication unit 115 communicates a frame signal conforming to the IuUP protocol with the IMS apparatus 120 (FIG. 1) via the IMS core network 102.

A call control signal transmission unit 114 generates a call control signal corresponding to the frame signal received from the wireless base station controller 100 and transmits the call control signal to the IMS apparatus 120. A determination unit 112 determines whether the frame signal received from the wireless base station controller 100 indicates a time alignment request for a sound signal in the downlink direction (from the IMS core network 102 to the circuit switching network 101) or not. When the received frame indicates the time alignment request, a protocol conversion unit 113 converts information on the time alignment included in the frame to information to be set in a call control signal generated by the call control signal transmission unit 114.

The time alignment request indicates adjustment time to be applied when the IMS apparatus 120 transmits a sound signal to the wireless base station controller 100. The IMS apparatus 120 which receives the time alignment request adjusts the transmission timing to the wireless base station controller 100 by the requested adjustment time. The technique of the time alignment according to the IuUP protocol is described in, for example, NPL 6.

Figure 3:
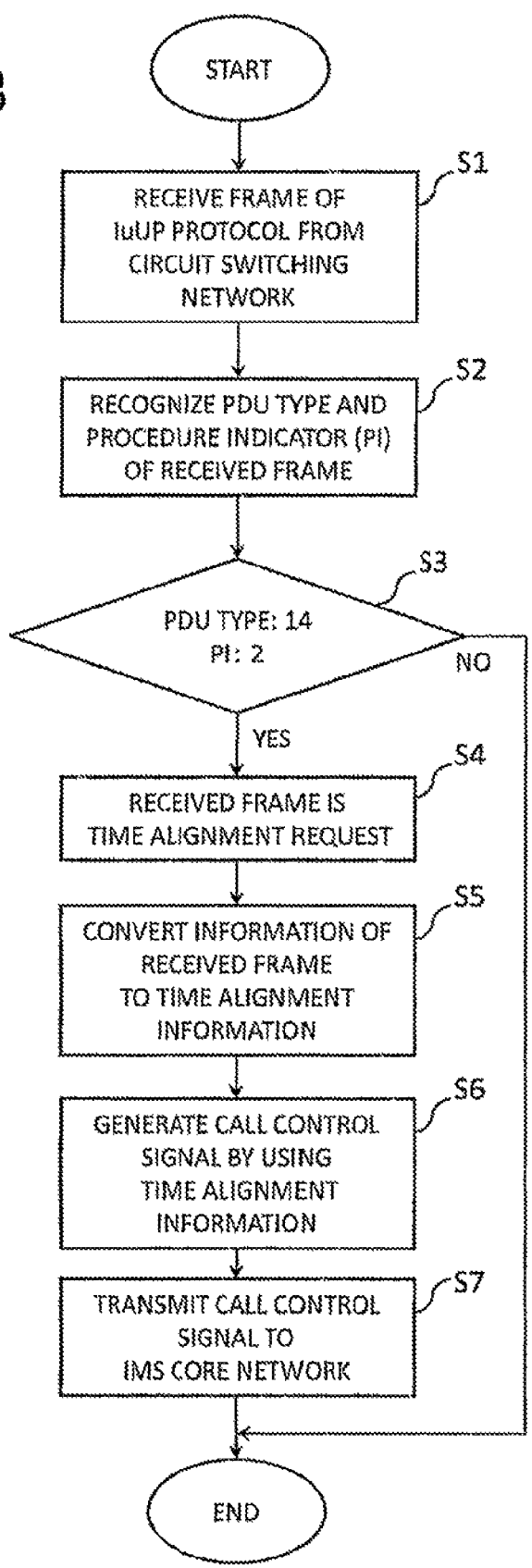
FIG. 3 is a flowchart showing an operation procedure of the first embodiment of the invention.

With reference to the flowchart of FIG. 3, the operation of the gateway apparatus 110 with the above-described configuration will be described. The U-Plane data communication unit 111 receives a frame signal of the IuUP protocol transmitted from the wireless base station controller 100 via the circuit switching network 101 (step S1).

The determination unit 112 extracts PDU type information and procedure indicator information from the reception frame. The determination unit 112 determines whether the PDU type information is "14" out of "0", "1", and "14" or not, and determines whether the procedure indicator information is "2" or not (step S2). The PDU type and procedure indicator information of the IuUP protocol frame is described in TS25.415 of 3GPP like the non-patent documents 4 and 6. If the PDU type is "14" and the procedure indicator information is "2" as a result of the determination (YES in step S3), the protocol conversion unit 113 recognizes that the received frame indicates an IuUP protocol time alignment request (step S4). In this case, the protocol conversion unit 113 takes out the information related to the time alignment included in the received frame and converts the information to information which is to be set in a call control signal transmitted to the IMS core network 102.

Concrete examples of the conversion will now be described. According to the IuUP protocol, the time alignment request is expressed by eight bits using codes from "0" to "255". For example, codes "1" to "80" correspond to "delay" from "0.5 ms" to "40 ms", and "129" to "208" correspond to "advance" from "0.5 ms" to "40 ms". Therefore, for example, when the code "1" is detected from a received frame, the protocol conversion unit 113 converts the code to "TA Delay 0.5 ms" expressing a request for delay of "0.5 ms" by the time alignment. For example, when the code is "208", the protocol conversion unit 113 converts the code to "TA Advance 40 ms" (advance by "40 ms").

The protocol conversion unit 113 supplies the time alignment information obtained as described above to the call control signal transmission unit 114.

The call control signal transmission unit 114 generates a call control signal to be transmitted to the IMS apparatus 120 using the time alignment information from the protocol conversion unit 113 (step S6). As a communication protocol of the call control signal, in the embodiment, the SIP (Session Initiation Protocol) information method is used. The details of the SIP Info method is described in, for example, NPL 7. The call control signal transmission unit 114 describes the time alignment information such as "TA Delay 0.5 ms" or "TA Advance 40 ms" in a message conforming to the SIP Info method. The location of describing the time alignment information is, for example, the body part in the message.

The call control signal transmission unit 114 transmits the call control signal in which the time alignment information is described and which is addressed to the IMS apparatus 120 to the IMS core network 102 (step S7).

In the embodiment, the call control process adapted to the IMS core network 102 can be performed on a frame signal of the time alignment request issued from the circuit switching network 101. Consequently, a downlink sound signal can be transmitted at a proper timing.

The present invention is not limited to the foregoing embodiment but can be properly changed within the scope of claims. For example, the protocol of the call control signal is not limited to the SIP Info method, but an SIP specified by RFC3261 can be used. A sound codec other than the AMR can be used.

The IMS apparatus 120 may be a apparatus which is connected to, not the IMS core network 102 formed in the IP network, but is connected to the IP network itself. In this case, the IMS core network 102 in FIG. 1 is replaced with an IP network as a fixed network.

The gateway apparatus 110 receives the U-plane data from the IMS apparatus 120 via the IMS core network 102, and outputs the U-plane data to the wireless base station controller 100 via the circuit switching network 101. Another IP network may be interposed between the circuit switching network 101 and the gateway apparatus 110.

Second Embodiment

Figure 4:
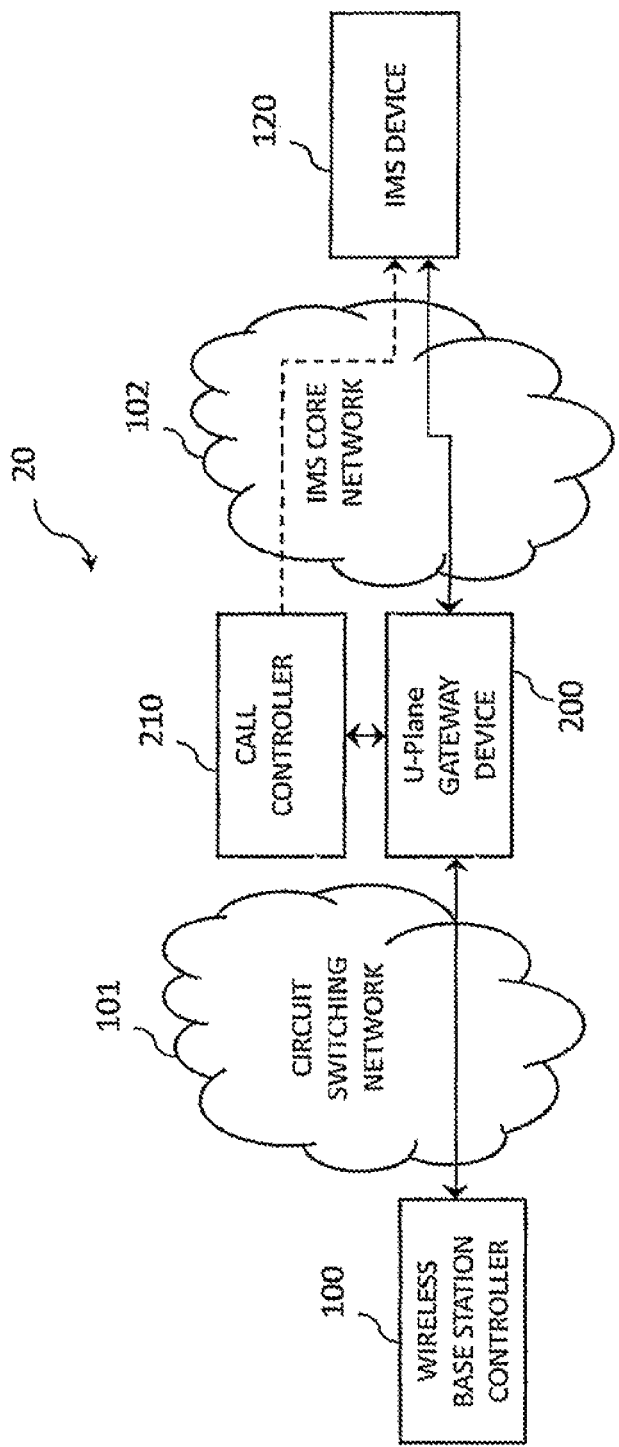
FIG. 4 is a configuration diagram of a communication system in a second embodiment of the invention.

FIG. 4 shows a communication system configuration of a second embodiment of the present invention. In a communication system 20 in the diagram, the same reference numerals are designated to components similar to those of the foregoing embodiment (FIG. 1).

The call control process and the U-plane process in the technical field of the present invention are conventionally processes of different properties. In the second embodiment, the communication system 20 in which the processes are executed by different apparatuses will be described. The communication system 20 has the configuration that the function of the gateway apparatus 110 of the foregoing embodiment is dispersed to a U-plane gateway apparatus 200 and a call controller 210.

Figure 5:
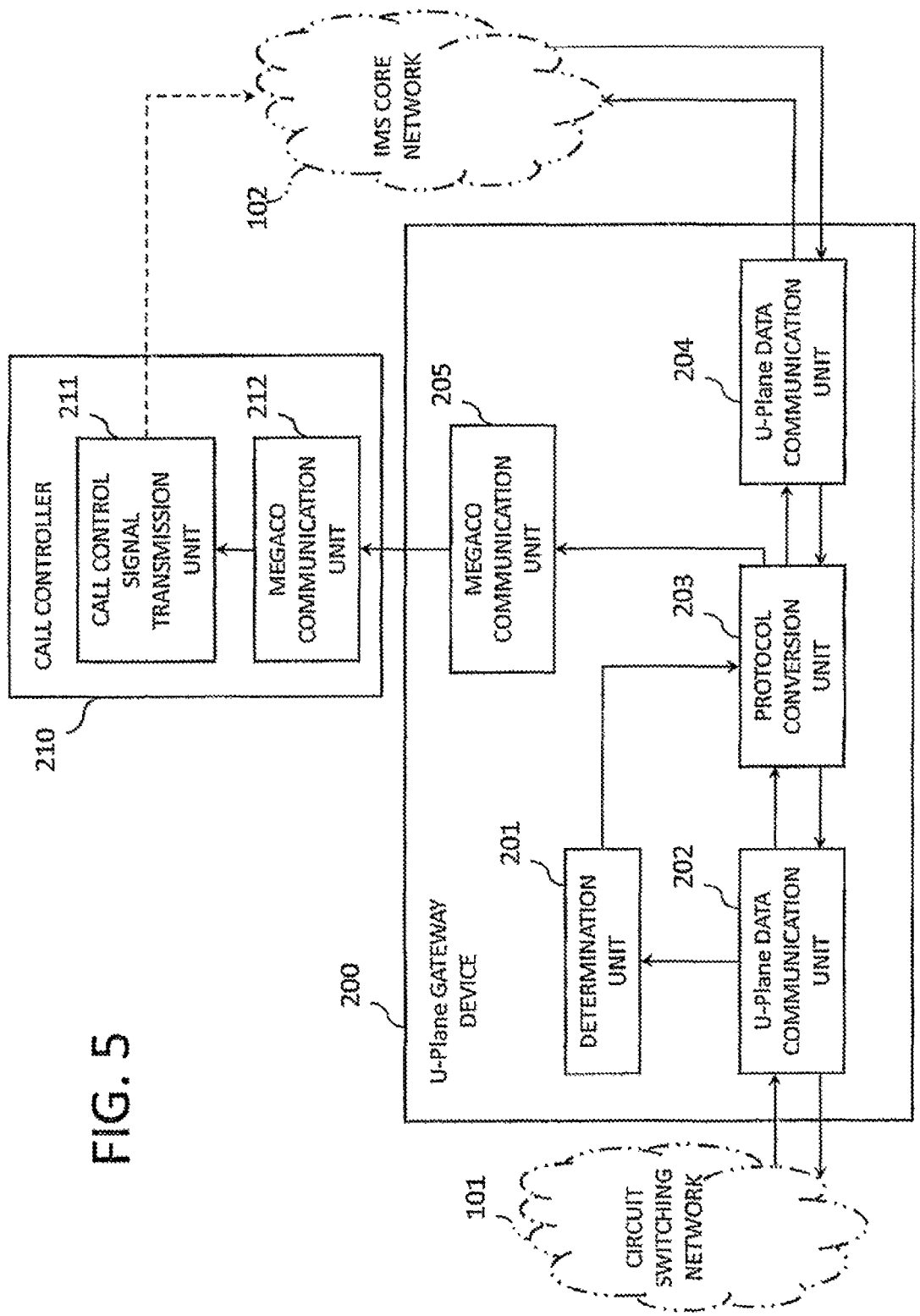
FIG. 5 is a block diagram of a U-Plane gateway apparatus and a flow controller in the second embodiment of the invention.

FIG. 5 shows a functional configuration of the U-plane gateway apparatus 200 and the call controller 210. In the U-plane gateway apparatus 200, a determination unit 201, a U-plane data communication unit 202, a protocol conversion unit 203, and a U-plane data communication unit 204 play functions similar to the determination unit 112, the U-plane data communication unit 111, the protocol conversion unit 113, and the U-plane data communication unit 115 in the gateway apparatus 110 in FIG. 2, respectively. A call control signal transmission unit 211 in the call controller 210 has the function similar to that of a call control signal transmission unit 114 (FIG. 2) of the gateway apparatus 110. The U-plane data communication unit 202 corresponds to a first communication unit in the gateway apparatus in the communication system of the present invention.

The U-plane gateway apparatus 200 and the call controller 210 are connected to each other so that they can communicate each other. As a protocol for the connection, in the second embodiment, an MEGACO (Media Gateway Control) specified in RFC3015 of IETF is used. For the connection using the MEGACO, as shown in FIG. 5, the U-plane gateway apparatus 200 is provided with an MEGACO communication unit 205, and the call controller 210 is provided with an MEGACO communication unit 212. The MEGACO communication unit 205 corresponds to a second communication unit of the gateway apparatus in the communication system of the present invention.

The operation of the second embodiment is basically similar to that of the foregoing embodiment described with reference to FIG. 3. Specifically, when the U-plane data communication unit 202 receives a frame of the IuUP protocol from the circuit switching network 101, the determination unit 201 recognizes the PDU type and the procedure indicator information of the frame. As a result of recognition, if the PDU type is "14" and the procedure indicator information is "2", the protocol conversion unit 203 determines that the received frame relates to a time alignment request. The protocol conversion unit 203 converts the information in the frame to time alignment information such as "TA Delay 0.5 ms" and supplies the information to the MEGACO communication unit 205.

The MEGACO communication unit 205 supplies, on an MEGACO signal, the time alignment information from the protocol conversion unit 203 together with transmission instruction information and the like to the call controller 210.

In the call controller 210, when the MEGACO communication unit 212 receives the time alignment information from the U-plane gateway apparatus 200, the call control signal transmission unit 211 generates a call control signal according to the SIP Info method by using the information. The call control signal transmission unit 211 transmits the generated call control signal to the IMS core network 102.

In the second embodiment, the call control process and the U-plane process are executed by different apparatuses, so that apparatuses optimum to the processes can be assigned. It facilitates assurance of scalability (the width from small capacity to large capacity) of the communication system.

The second embodiment can be modified like the first embodiment. Further, the protocol for connecting the U-plane gateway apparatus 200 and the call controller 210 is not limited to the MEGACO but may be any protocol such as SIP as long as the protocol is adapted to the protocol of the call control signal.

Third Embodiment

Figure 6:
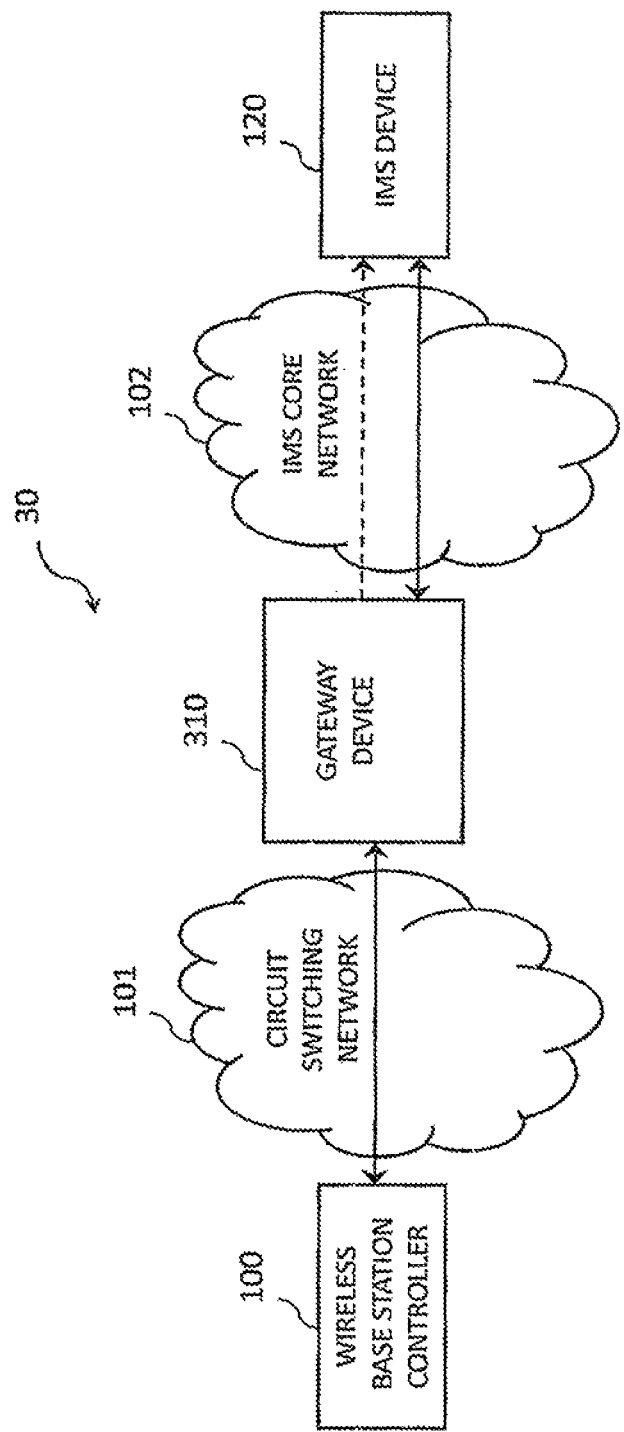
FIG. 6 is a configuration diagram of a communication system in a third embodiment of the invention.

FIG. 6 shows a communication system configuration of a third embodiment of the present invention. In a communication system 30 in the diagram, the same reference numerals are designated to components similar to those of the foregoing embodiment shown in FIG. 1. In FIG. 30, a gateway apparatus 310 is connected to the wireless base station controller 100 via the circuit switching network 101 and is connected to the IMS apparatus 120 via the IMS core network 102 like the gateway apparatus 110 (FIG. 1).

In a manner similar to the gateway apparatus 110 (FIG. 1), the gateway apparatus 310 receives a frame signal conforming to the IuUP protocol used in the circuit switching network 101 as user plane data from the wireless base station controller 100.

Figure 7:
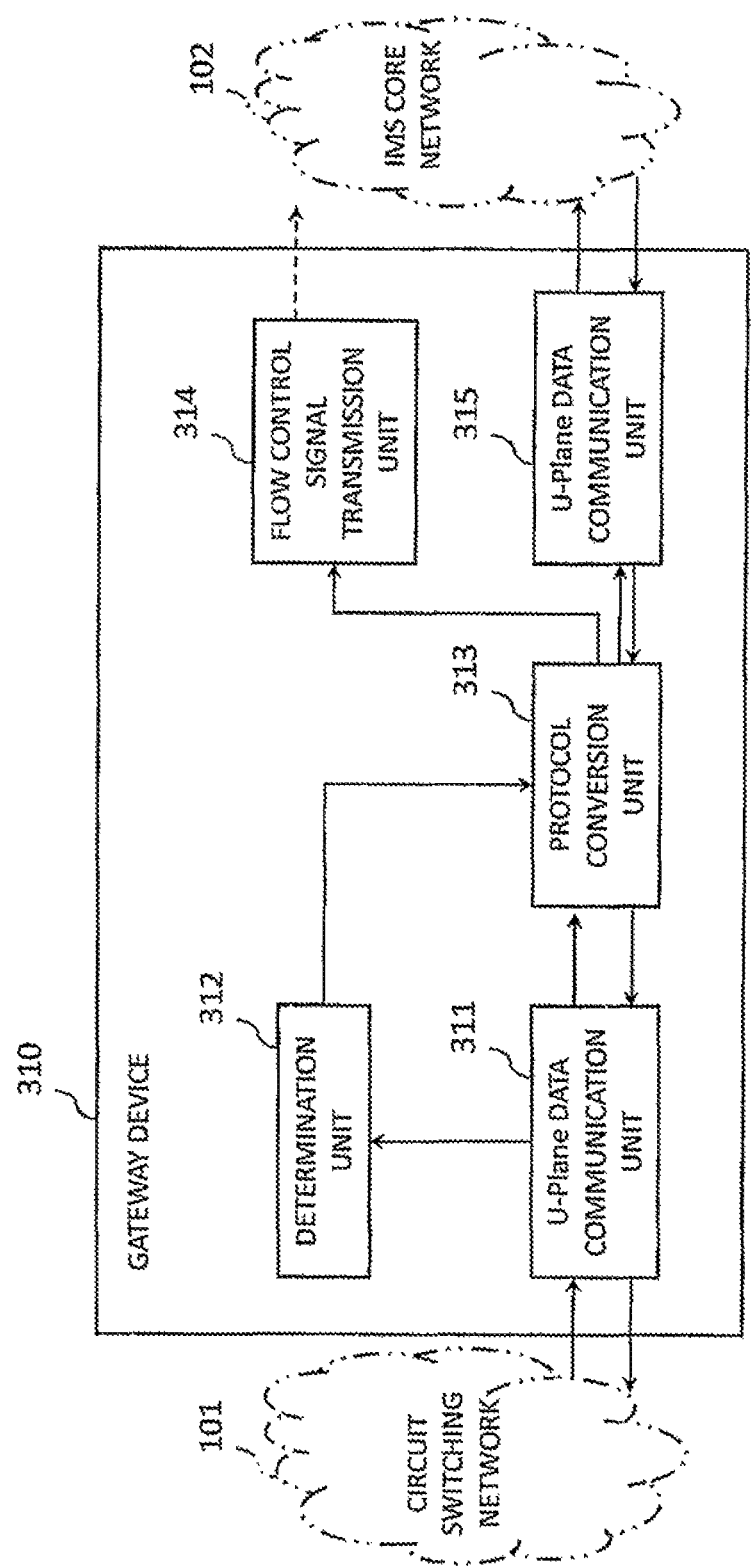
FIG. 7 is a block diagram of a gateway apparatus in the third embodiment of the invention.

FIG. 7 shows the functional configuration of the gateway apparatus 310. A U-plane data communication unit 311 communicates a frame signal conforming to the IuUP protocol with the wireless base station controller 100 (FIG. 6) via the circuit switching network 101. A U-plane data communication unit 315 communicates a frame signal conforming to the IuUP protocol with the IMS apparatus 120 (FIG. 6) via the IMS core network 102.

A flow control signal transmission unit 314 generates a flow control signal corresponding to the frame signal received from the wireless base station controller 100 and transmits the flow control signal to the IMS apparatus 120. A determination unit 312 determines whether the frame signal received from the wireless base station controller 100 indicates the above-described time alignment request or not. When the received frame indicates the time alignment request, a protocol conversion unit 313 converts information included in the frame to information to be set in a flow control signal generated by the flow control signal transmission unit 314.

Figure 8:
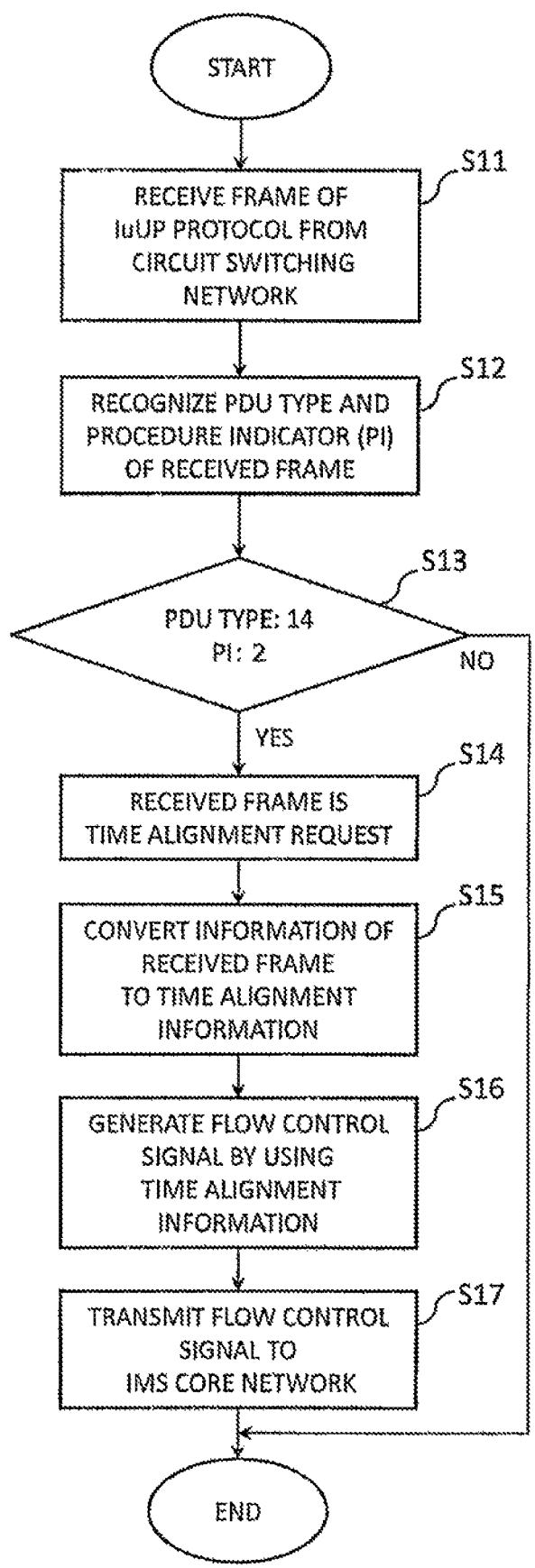
FIG. 8 is a flowchart showing an operation procedure of the third embodiment of the invention.

With reference to the flowchart of FIG. 8, the operation of the gateway apparatus 310 with the above-described configuration will be described. The procedure (steps S11 to S14) since the gateway apparatus 310 receives a frame of the IuUP protocol transmitted from the circuit switching network 101 until it is determined that the frame relates to the time alignment request is similar to the procedure (S1 to S4 in FIG. 3) of the foregoing embodiment, and its description will not be repeated.

If the received frame relates to the time alignment request, the protocol conversion unit 313 converts the information on the time alignment included in the frame to information to be set in the flow control signal to the IMS core network 102 (step S15). In the third embodiment, in a manner similar to the foregoing embodiments, an 8-bit code taken from the received frame is converted to time alignment information such as "TA Delay 0.5 ms" or "TA Advance 40 ms".

As the flow control signal, for example, an RTCP (RTP (Real-time Transport Protocol) Control Protocol) APP packet described in NPL 5 can be used. An RTCP APP packet is a kind of the RTCP packet which can be specified according to the application. By setting "204" in the packet type (PT) field in an RTP packet, it can be defined that the packet is an RTCP APP packet.

The flow control signal transmission unit 314 generates a flow control signal to be transmitted to the IMS apparatus 120 using the time alignment information from the protocol conversion unit 313 (step S16). Concretely, if the flow control signal is an RTCP APP packet, time alignment information such as "TA Delay 0.5 ms" is written in a data storage field of the packet. The RTCP APP packet can be transmitted at an arbitrary timing. As soon as the RTCP APP packet is generated, the flow control signal transmission unit 314 transmits the RTCP APP packet to the IMS apparatus 120 (step S17).

In the embodiment, the flow control process adapted to the IMS core network 102 can be performed on a frame signal of the time alignment request issued from the circuit switching network 101. Consequently, a downlink sound signal can be transmitted at a proper timing.

The embodiment can be variously modified. For example, the form of the flow control signal is not limited to the RTCP APP packet of IETF Audio-Video Transport Working Group, "Request For Comment (RFC) 1889", pp. 37 to 38, Section 6.6, issued in January, 2006, ftp://ftp.rfc-editor.org/in-notes/rfc1889.txt, searched on the Internet on Dec. 28, 2007

(RFC1889), but a packet conforming to RTCP specified by RFC3551 can be used. A packet format in RFC3267 or RFC4867 may be used.

In a manner similar to the foregoing embodiment, a sound codec other than the AMR can be used. The IMS apparatus 120 may be a apparatus which is connected to, not the IMS core network 102 formed in the IP network, but is connected to the IP network itself. The gateway apparatus 110 can receive the U-plane data from the IMS apparatus 120 via the IMS core network 102, and output the U-plane data to the wireless base station controller 100 via the circuit switching network 101.

Fourth Embodiment

Figure 9:
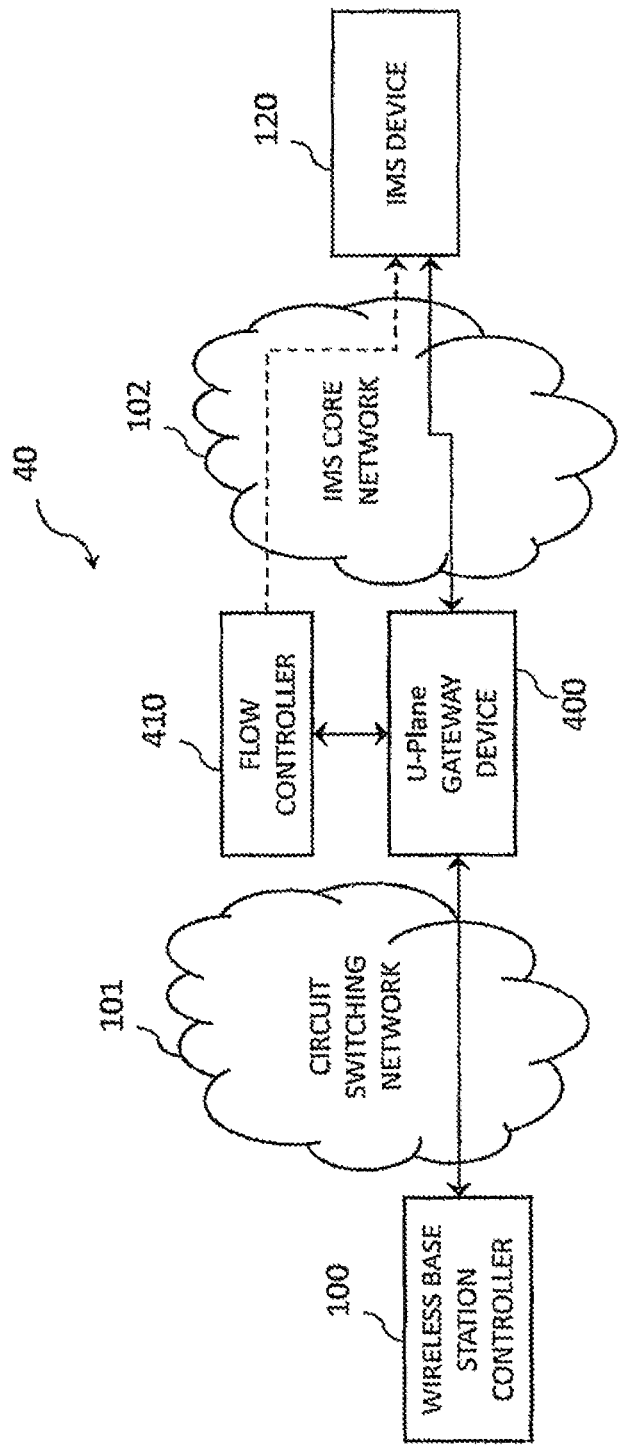
FIG. 9 is a configuration diagram of a communication system in a fourth embodiment of the invention.

FIG. 9 shows a communication system configuration of a fourth embodiment of the present invention. In a communication system 40 in the diagram, the same reference numerals are designated to components similar to those of the embodiment of FIG. 6.

The flow control process and the U-plane process in the technical field of the present invention are conventionally processes of different properties. In the fourth embodiment, the communication system 40 in which the processes are executed by different apparatuses will be described. The communication system 40 has the configuration that the function of the gateway apparatus 310 (FIG. 6) of the foregoing embodiment is dispersed to a U-plane gateway apparatus 400 and a flow controller 410.

Figure 10:
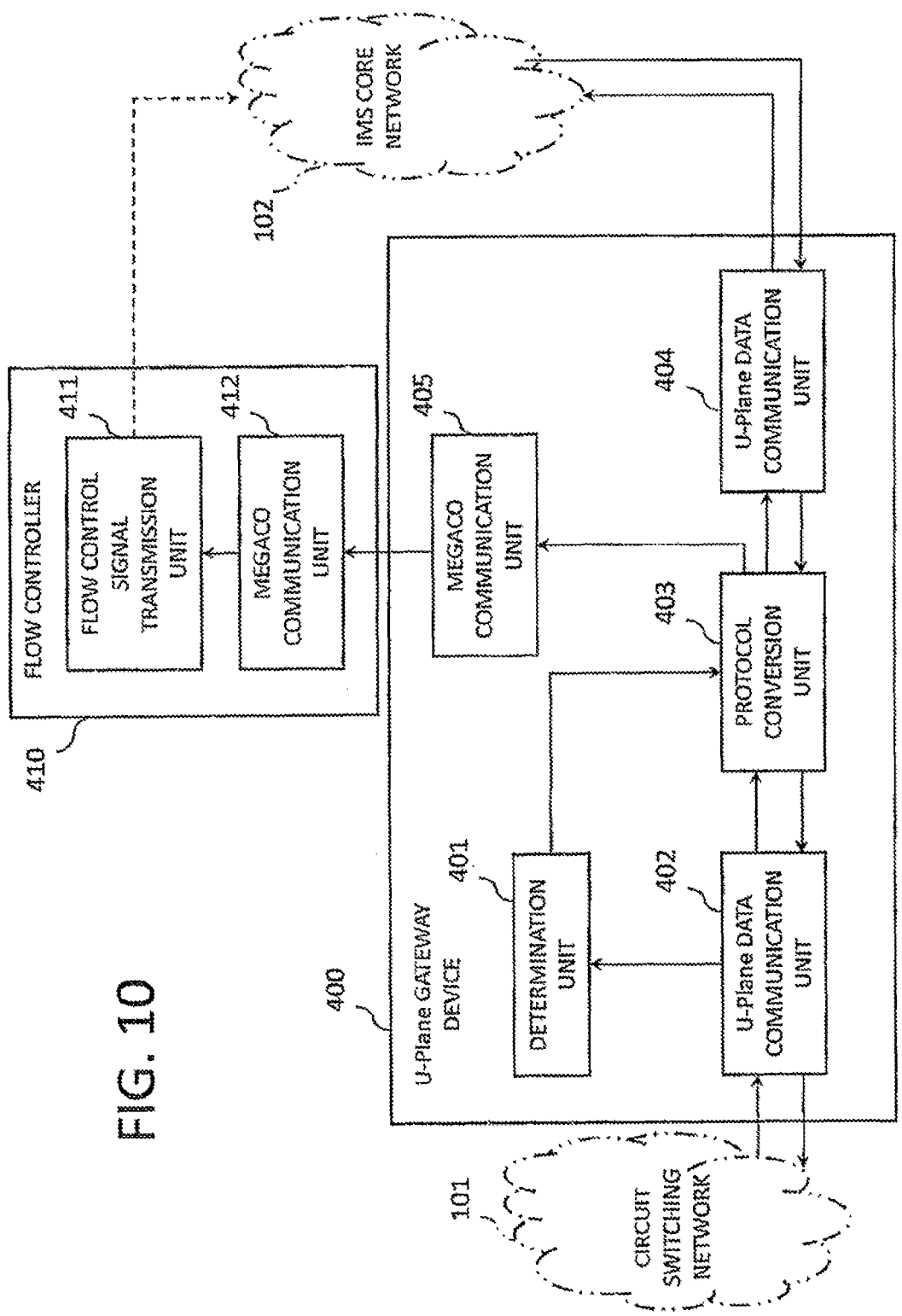
FIG. 10 is a block diagram of a U-Plane gateway apparatus and a flow controller in the fourth embodiment of the invention.

FIG. 10 shows a functional configuration of the U-plane gateway apparatus 400 and the flow controller 410. In the U-plane gateway apparatus 400, a determination unit 401, a U-plane data communication unit 402, a protocol conversion unit 403, and a U-plane data communication unit 404 play functions similar to the determination unit 112, the U-plane data communication unit 311, the protocol conversion unit 313, and the U-plane data communication unit 315 in the gateway apparatus 310 in FIG. 7, respectively. A flow control signal transmission unit 411 in the flow controller 410 has the function similar to that of the flow control signal transmission unit 314 of FIG. 7. The U-plane data communication unit 402 corresponds to a first communication unit in the gateway apparatus in the communication system of the present invention.

The U-plane gateway apparatus 400 and the flow controller 410 are connected to each other so that they can communicate each other. As a protocol for the connection, in the fourth embodiment, the above-described MEGACO is used. For the connection using the MEGACO, as shown in FIG. 10, the U-plane gateway apparatus 400 is provided with an MEGACO communication unit 405, and the flow controller 410 is provided with an MEGACO communication unit 412. The MEGACO communication unit 405 corresponds to a second communication unit of the gateway apparatus in the communication system of the present invention.

The operation of the fourth embodiment is basically similar to that of the foregoing embodiment described with reference to FIG. 8. Specifically, when the U-plane data communication unit 402 receives a frame of the IuUP protocol from the circuit switching network 101, the determination unit 401 recognizes the PDU type and the procedure indicator information of the frame. As a result of recognition, if the PDU type is "14" and the procedure indicator information is "2", the protocol conversion unit 413 determines that the received frame relates to a time alignment request. The protocol conversion unit 413 converts the information in the frame to time alignment information such as "TA Delay 0.5 ms" and supplies the time alignment information to the MEGACO communication unit 405.

The MEGACO communication unit 405 supplies, on an MEGACO signal, the time alignment information from the protocol conversion unit 413 together with transmission instruction information and the like to the flow controller 410.

In the flow controller 410, when the MEGACO communication unit 412 receives the time alignment information from the U-plane gateway apparatus 400, the flow control signal transmission unit 411 generates a call control signal in an RTCP APP packet by using the received information. The flow control signal transmission unit 411 transmits the generated flow control signal to the IMS core network 102.

In the fourth embodiment, the flow control process and the U-plane process are executed by different apparatuses, so that apparatuses optimum to the processes can be assigned. It facilitates assurance of scalability (the width from small capacity to large capacity) of the communication system.

The fourth embodiment can be modified like the third embodiment. Further, the protocol for connecting the U-plane gateway apparatus 400 and the flow controller 410 is not limited to the MEGACO but may be any protocol such as SIP as long as the protocol is adapted to the protocol of the flow control signal.

The present invention can be carried out as a computer program corresponding to the operation procedure of the gateway apparatus in each of the foregoing embodiments and a recording medium that stores the program.

The invention claimed is:

1. A gateway apparatus comprising:
   a communication unit communicating a frame signal conforming to an Iu User Plane (IuUP) protocol with a wireless base station controller connected to a circuit switching network;
   a determination unit determining whether the frame signal received by the communication unit indicates a time alignment request for a sound signal to the circuit switching network or not;
   a conversion unit converting information included in the frame signal to information to be set in a control signal of an IP Multimedia Subsystem (IMS) when the frame signal indicates the time alignment request, the information included in the frame signal being information on a time alignment, the control signal being one of a flow control signal and a call control signal; and
   a control signal transmission unit transmitting the control signal including the converted information to a communication apparatus in the IMS.

2. The gateway apparatus according to claim 1, wherein the control signal is a call control signal, and the call control signal transmission unit transmits a signal conforming to Session Initiation Protocol (SIP) as the call control signal.

3. The gateway apparatus according to claim 2, wherein the call control signal is a message of SIP Info method.

4. The gateway apparatus according to claim 1, wherein the control signal is a flow control signal, and the flow control signal transmission unit transmits a signal conforming to RTP Control Protocol (RTCP) as the flow control signal.

5. The gateway apparatus according to claim 4, wherein the flow control signal is an RTCP APP packet.

6. A communication system comprising:
a gateway apparatus; and
a call controller connected to the gateway apparatus communicatably, wherein the gateway apparatus comprises:
a first communication unit communicating a frame signal conforming to an Iu User Plane (IuUP) protocol with a wireless base station controller connected to a circuit switching network;
a determination unit determining whether the frame signal received by the first communication unit indicates a time alignment request for a sound signal to the circuit switching network or not;
a conversion unit converting information included in the frame signal to information to be set in a control signal of an IP Multimedia Subsystem (IMS) when the frame signal indicates the time alignment request, the information included in the frame signal being information on a time alignment, the control signal being one of a flow control signal and a call control signal; and
a second communication unit transmitting the information converted by the conversion unit to the controller, and
the controller comprises
a control signal transmission unit transmitting the control signal including the information received from the gateway apparatus to a communication apparatus in the IMS.

7. The communication system according to claim 6, wherein the control signal is a call control signal, and the call control signal transmission unit transmits a signal conforming to Session Initiation Protocol (SIP) as the call control signal.

8. The communication system according to claim 7, wherein the call control signal is a message of SIP Info method.

9. The communication system according to claim 6, wherein the second communication unit transmits the information to be transmitted to the controller by an Media Gateway Control (MEGACO) protocol.

10. The communication system according to claim 6, wherein the control signal is a flow control signal, and the flow control signal transmission unit transmits a signal conforming to RTP Control Protocol (RTCP) as the flow control signal.

11. The communication system according to claim 10, wherein the flow control signal is an RTCP APP packet.

12. A communication method comprising the steps of:
receiving a frame signal conforming to an Iu User Plane (IuUP) protocol from a wireless base station controller connected to a circuit switching network;
determining whether the frame signal indicates a time alignment request for a sound signal to the circuit switching network or not;
converting information included in the frame signal to information to be set in a control signal of an IP Multimedia Subsystem (IMS) when the frame signal indicates the time alignment request, the information included in the frame signal being information on a time alignment, the control signal being one of a flow control signal and a call control signal; and
transmitting the control signal including the converted information to a communication apparatus in the IMS.

13. The communication method according to claim 12, wherein the control signal is a call control signal, and the call control signal is a signal conforming to Session Initiation Protocol (SIP).

14. The communication method according to claim 13, wherein the call control signal is a message of SIP Info method.

15. The communication method according to claim 12, wherein the control signal is a flow control signal, and the flow control signal is a signal conforming to RTP Control Protocol (RTCP).

16. The communication method according to claim 15, wherein the flow control signal is an RTCP APP packet.

* * * * *